United States Patent
Starling et al.

(10) Patent No.: US 8,787,550 B2
(45) Date of Patent: *Jul. 22, 2014

(54) METHODS, SYSTEMS, AND COMPUTER PROGRAM PRODUCTS FOR PROCESSING A NATURE OF ADDRESS INDICATOR AND/OR CALLING PARTY NUMBER TO SUPPORT TELECOMMUNICATION FEATURES

(71) Applicant: AT&T Intellectual Property I, L.P., Reno, NV (US)

(72) Inventors: Gerald Starling, Hampton, GA (US); Robert Dewey Smith, Jr., McCalla, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,550

(22) Filed: Jun. 17, 2013

(65) Prior Publication Data

US 2013/0279682 A1    Oct. 24, 2013

Related U.S. Application Data

(63) Continuation of application No. 13/489,048, filed on Jun. 5, 2012, now Pat. No. 8,467,516, which is a continuation of application No. 11/290,958, filed on Nov. 30, 2005, now Pat. No. 8,213,593.

(60) Provisional application No. 60/689,928, filed on Jun. 13, 2005.

(51) Int. Cl.
*H04M 7/00* (2006.01)

(52) U.S. Cl.
USPC .............. 379/219; 379/221.13; 379/207.02; 379/221.02; 379/221.14; 379/114.01; 455/561; 455/432.1

(58) Field of Classification Search
USPC ............ 379/220.01, 201.01, 207.07, 207.11; 370/410; 455/410
See application file for complete search history.

(56) References Cited

U.S. PATENT DOCUMENTS

| | | |
|---|---|---|
| 5,937,053 A | 8/1999 | Lee et al. |
| 6,363,411 B1 | 3/2002 | Dugan et al. |
| 2001/0040957 A1 | 11/2001 | McCann et al. |
| 2003/0072425 A1 | 4/2003 | Hurst |
| 2003/0165226 A1 | 9/2003 | Vu et al. |
| 2004/0125814 A1 | 7/2004 | Christie et al. |
| 2004/0204118 A1 | 10/2004 | Tsai et al. |
| 2004/0213150 A1 | 10/2004 | Krause et al. |
| 2005/0070278 A1 | 3/2005 | Jiang |
| 2005/0197101 A1 | 9/2005 | Gupta |
| 2005/0207435 A1 | 9/2005 | Christie et al. |
| 2006/0111116 A1 | 5/2006 | Palmer et al. |
| 2006/0262752 A1 | 11/2006 | Moore et al. |
| 2007/0115947 A1 | 5/2007 | Nelson et al. |
| 2009/0011758 A1 | 1/2009 | Aoki et al. |

*Primary Examiner* — Joseph J Nguyen
(74) *Attorney, Agent, or Firm* — Myers Bigel Sibley & Sajovec, PA

(57) ABSTRACT

A call is processed by examining a nature of address indicator in a signaling message associated with the call and allowing the call to complete in a jurisdiction associated with a national nature of address indicator if the nature of address indicator is international. A call is also processed by examining a nature of address indicator in a signaling message associated with the call. A number of digits associated with a calling party number in the signaling message is determined and the call is allowed to complete if the nature of address indicator is national and the number of digits associated with the calling party number exceeds ten.

15 Claims, 3 Drawing Sheets

| | International | Unique National |
|---|---|---|
| 10 Digits | Process call; block calling party number; create call record | Process call conventionally |
| > 10 Digits | Process call; block calling party number; create call record | Process call; allow/block calling party number; create call record |

|  | International | Unique National |
|---|---|---|
| 10 Digits | Process call; block calling party number; create call record | Process call conventionally |
| > 10 Digits | Process call; block calling party number; create call record | Process call; allow/ block calling party number; create call record |

METHODS, SYSTEMS, AND COMPUTER PROGRAM PRODUCTS FOR PROCESSING A NATURE OF ADDRESS INDICATOR AND/OR CALLING PARTY NUMBER TO SUPPORT TELECOMMUNICATION FEATURES

RELATED APPLICATION

This application is a continuation of U.S. application Ser. No. 13/489,048, filed Jun. 5, 2012, which is a continuation of U.S. application Ser. No. 11/290,958, filed Nov. 30, 2005, which claims the benefit of and priority to U.S. Provisional Patent Application No. 60/689,928, filed Jun. 13, 2005, the disclosures of which are hereby incorporated herein by reference as if set forth in their entirety.

FIELD OF THE INVENTION

The present invention relates to communication networks, and, more particularly, to communication networks that use common channel signaling, such as Signaling System 7 (SS7).

BACKGROUND OF THE INVENTION

A voice and/or data call on a communication network may be viewed as comprising two components: 1) the actual content, e.g., voice or data information being communicated, and 2) the information transmitted that is used by the communication network in establishing connections and routing the content to the appropriate destination. Historically, connections in the public switched telephone network (PSTN) were established and managed using "in band" signaling techniques. In band signaling involves transmitting on the same medium that carries the content of the connection. Unfortunately, in band signaling can be inefficient in that network resources are reserved from the point a call is originated to the destination point of the call even if the called party is unable to answer the call.

Another type of signaling in which the signaling information is carried separately from the bearer channels used to carry the content of the connection is known as Common Channel Signaling (CCS). A CCS system may operate as a single resource that is dedicated to signaling and can be used to manage numerous connections in the PSTN, for example, that carry content. One example of a CCS protocol is Signaling System 7 (SS7), which is a set of protocols that describe a framework by which information is exchanged between systems in a network via dedicated signaling channels. Advantageously, CCS systems in general, and SS7 systems in particular, are substantially independent of the underlying switching and transmission technology. As a result, SS7 systems can evolve without being dependent on the evolution of the switching and/or transmission equipment that is used to carry content in the network.

SUMMARY OF THE INVENTION

According to some embodiments of the present invention, a call is processed by examining a nature of address indicator in a signaling message associated with the call and allowing the call to complete in a jurisdiction associated with a national nature of address indicator if the nature of address indicator is international.

In other embodiments, a calling party number in the signaling message is blocked from being communicated with the call and a call record is created.

In still other embodiments, the signaling message is a Signaling System 7 Initial Address Message.

In still other embodiments, the call originates as a wireless call.

In further embodiments of the present invention, a call is processed by examining a nature of address indicator in a signaling message associated with the call. A number of digits associated with a calling party number in the signaling message is determined and the call is allowed to complete if the nature of address indicator is national and the number of digits associated with the calling party number exceeds ten.

In still further embodiments of the present invention, at least a portion of the digits associated with the calling party number is processed to facilitate operation of a service.

In still further embodiments of the present invention, a determination is made whether to block or to allow the calling party number to be communicated with the call based on whether the service has been paid for by a customer and/or provisioned by a service provider.

In still further embodiments of the present invention, the service is a point-to-point push-to-talk call.

In still further embodiments of the present invention, a first portion of the calling party number comprises an originating party's number and a second portion of the calling party number comprises a point-to-point code to activate a terminating party client.

In still further embodiments of the present invention, the service is a push-to-talk group call.

In still further embodiments of the present invention, a first portion of the calling party number comprises a group identification number and a second portion of the calling party number comprises a group call code to activate at least one terminating party client.

In still further embodiments of the present invention, a call record is created.

In still further embodiments of the present invention, the signaling message is a Signaling System 7 Initial Address Message.

Although described primarily above with respect to method aspects of the present invention, it will be understood that the present invention may also be embodied as systems and computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which:

FIG. 3 is a table that illustrates operations for processing a SS7 nature of address indicator and/or calling party number to support various telecommunication features in accordance with some embodiments of the present invention.

DETAILED DESCRIPTION OF EXEMPLARY EMBODIMENTS

Figure 1:
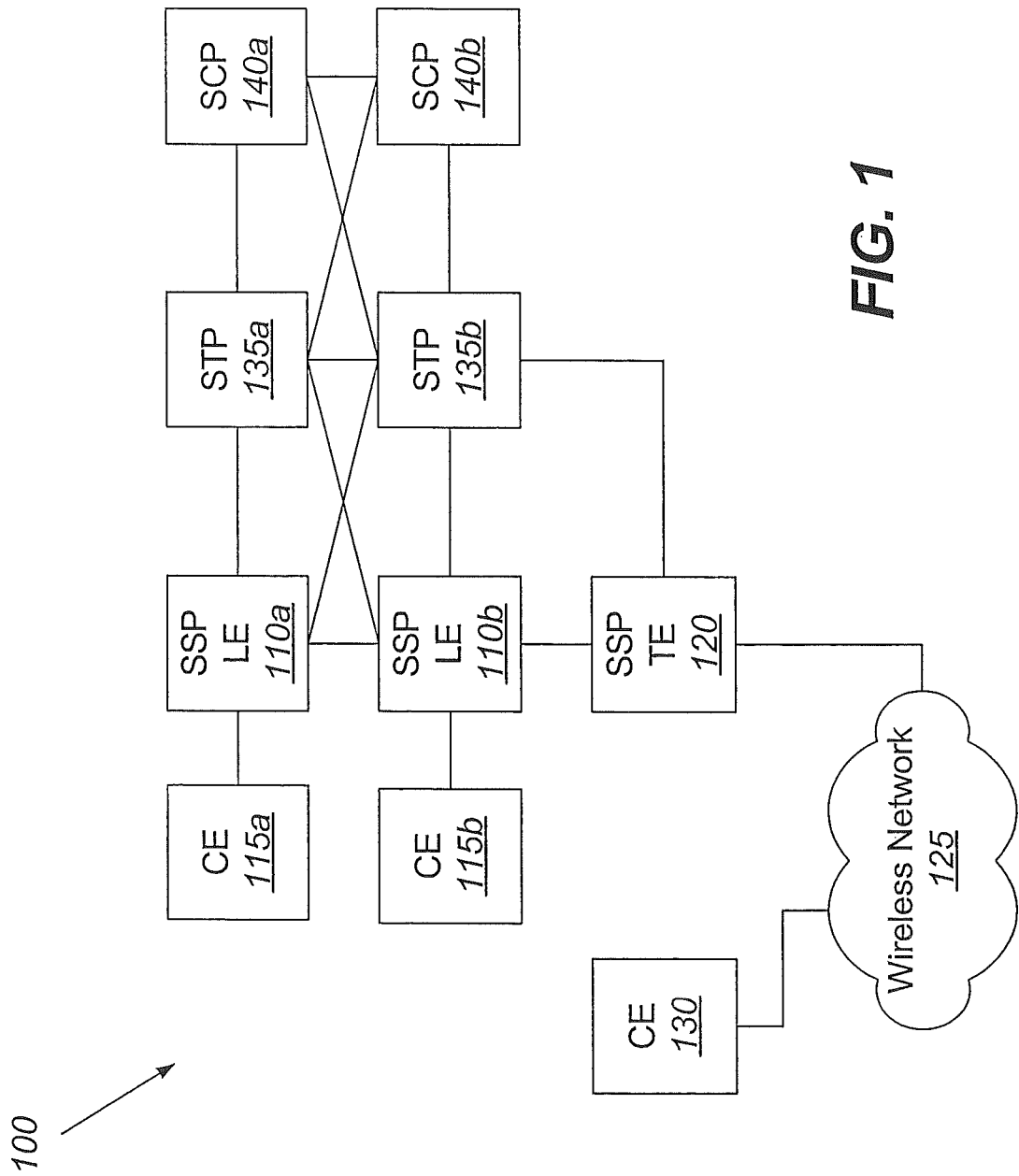
FIG. 1 is a block diagram that illustrates a communication network in accordance with some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

For purposes of illustration, embodiments of the present invention are described herein with respect to use of a Signaling System 7 (SS7) network to process a nature of address indicator and/or a calling party number to support various features for both a network service provider and/or an end user. It will be understood, however, that embodiments of the present invention are not limited to SS7 networks or any particular Common Channel Signaling (CCS) network, but instead may be embodied generally as any network architecture capable of carrying out the operations described herein.

Referring now to FIG. 1, an exemplary SS7 network architecture 100 for processing a nature of address indicator and/or calling party number to support various telecommunication features, in accordance with some embodiments of the present invention, comprises Service Switching Points (SSPs) 110a and 110b that terminate customer equipment (CE) 115a and 115b, respectively. It will be understood that CE 115a and 115b may represent one or more devices that may be used to originate and or terminate a call over a communication network, such as the public switched telephone network (PSTN). The SS7 network 100 further comprises an SSP 120 that is connected to a wireless network 125 by, for example, trunk lines/channels. The wireless network terminates CE 130, which may represent one or more mobile terminals. As used herein, the term "mobile terminal or device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

SSPs 110a and 110b are switches that originate, terminate, and route calls and provide entry into the SS7 network. SSPs 110a and 110b may be called "local exchange" switches because they terminate connections to end-users and, as shown in FIG. 1, optionally include trunk connection(s) between each other. SSP 120 may be called a "tandem exchange" because it does not terminate connections to end users, but instead terminates only trunks to other SSPs (e.g., SSP 110b) or the wireless network 125, for example. SSPs 110a and 110b may be referred to as Class 5 switching systems while SSP 120 may be referred to as a Class 4 switching system.

In an SS7 network, SSPs send signaling messages to other SSPs-to setup, manage, and release network resources to complete calls/connections. The signaling traffic between SSPs is carried by one or more Signal Transfer Points (STPs). As shown in FIG. 1, STPs 135a and 135b may be used to SS7 signaling messages between SSPs 110a and 110b and/or to other SSPs not shown in FIG. 1. An STP is typically embodied as a packet switch that routes each incoming message to an outgoing signaling link based on routing information contained in the SS7 message.

The SS7 network 100 further comprises Signal Control Points (SCPs) 140a and 140b, which may optionally be used to provide Intelligent Network (IN) services by allowing the SSPs in the SS7 network to access the SCPs via special signaling messages.

Although FIG. 1 illustrates an exemplary communication network, it will be understood that the present invention is not limited to such configurations, but is intended to encompass any configuration capable of carrying out the operations described herein.

Figure 2:
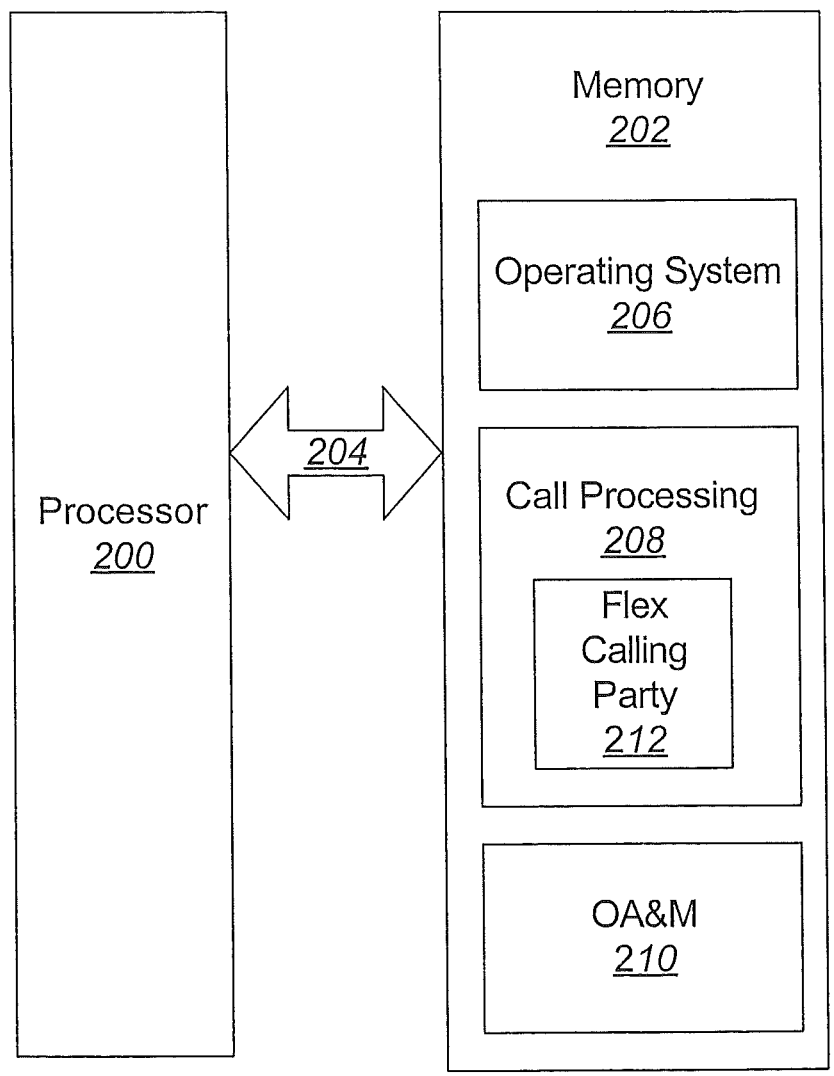
FIG. 2 is a block diagram that illustrates a software architecture for processing a SS7 nature of address indicator and/or calling party number to support various telecommunication features in accordance with some embodiments of the present invention.

FIG. 2 illustrates a processor 200 and a memory 202 that may be used in embodiments of methods, systems, and computer program products for processing a SS7 nature of address indicator and/or calling party number to support various telecommunication features. For example, in some embodiments of the present invention, the processor 200 and memory 202 may be used to embody the processors and the memories used in the SSPs 110a, 110b, and 120 of FIG. 1. The processor 200 communicates with the memory 202 via an address/data bus 204. The processor 200 may be, for example, a commercially available or custom microprocessor that is suitable for use in a real-time telecommunication system, such as a Class 5 and/or Class 4 switching system. The memory 202 is representative of the overall hierarchy of memory devices containing the software and data used to process a nature of address indicator and/or calling party number to support various telecommunication features, in accordance with some embodiments of the present invention. The memory 202 may include, but is not limited to, the following types of devices: cache, ROM, PROM, EPROM, EEPROM, flash, SRAM, and DRAM.

As shown in FIG. 2, the memory 202 may hold three or more major categories of software and data: an operating system 206, a call processing module 208, and a operations, administration, and maintenance (OA&M) module 210. The operating system 206 controls the operation of the SSP. In particular, the operating system 206 may manage the SSP's resources and may coordinate execution of programs by the processor 200.

The call-processing module 208 may provide the logic for originating, routing, terminating, and/or maintaining calls on the SSP. The OA&M module 210 may provide the logic for maintaining an SSP including, but not limited to, maintenance functionality, diagnostic functionality, provisioning functionality, and/or billing functionality.

The call processing module 208 comprises a flex calling party module 212 in accordance with some embodiments of the present invention. The flex calling party module 212 cooperates with the SS7 protocol to process an Initial Address Message (IAM). The IAM is a message that is used as part of the SS7 ISDN User Part (ISUP) layer. The ISUP layer corresponds generally to parts of the transport through application layers in the Open Systems Interconnect (OSI) seven-layer model. ISUP defines the protocol and procedures used to set-up, manage, and release network resources that carry calls over a communication network, such as the PSTN. ISUP is used for both ISDN and non-ISDN calls. An IAM message is forwarded from the originating SSP to the terminating SSP via the STPs in the SS7 network. The IAM contains the called party number in the mandatory variable part of the message and contains the calling party number and the nature of address indicator in the optional variable part of the message. According to some embodiments of the present invention, the flex calling party module 212 processes the nature of address indicator and/or the calling party number in the IAM message to support various telecommunication features. The nature of address indicator specifies whether an address is for national, international, or other use.

Although FIG. 2 illustrates an exemplary software architecture that may facilitate processing of a nature of address indicator and/or calling party number in an SS7 IAM message to support various features for both a network service provider and/or an end user, it will be understood that the present invention is not limited to such a configuration but is intended to encompass any configuration capable of carrying out the operations described herein.

Computer program code for carrying out operations of SSPs discussed above with respect to FIG. 2 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary operations for processing a nature of address indicator and/or calling party number in an SS7 IAM message to support various telecommunication features will now be described with reference to FIG. 3. The table of FIG. 3 illustrates a decision matrix for processing the nature of address indicator and the calling party number in an SS7 IAM message. The nature of address indicator is represented by the two columns while the calling party number is represented by the two rows. Example 1 below illustrates the nature of address indicator and the calling party number fields in an IAM message for a call made in the United States:

| 42 | 00001010 | 0a | OF | Calling Party Number Identifier |
|---|---|---|---|---|
| 43 | 00000111 | 07 | OV | Length = 7 octets |
| 44 | -0000011 | 03 | OV | Nature of Address Indicator = Unique national number |
|  | 0------- |  | OV | Odd/Even Indicator = Even num of address signals |
| 45 | ------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 00000010 | 02 | OV | Calling Party Number = 2059522504 |

EXAMPLE 1

In this case, the nature of address indicator is unique national (i.e., a U.S. call) and the calling party number is a 10-digit phone number. Such a call would be processed conventionally in the SS7 network by forwarding the calling party number to the destination SSP via, potentially, one or more STPs.

According to some embodiments of the present invention, if the flex calling party module 212 in an SSP detects that the nature of address indicator in an SS7 IAM message is International, then, regardless of how many digits are in the calling party number, the call is processed, the calling party number is blocked (i.e., not forwarded to an STP) and a call record is created for billing. In conventional SS7 networks, such a call would have been blocked in the United States. Advantageously, by allowing the call to complete, an International wireless roamer, for example, may be allowed to make domestic calls while in the United States. Thus, a telecommunications service provider may offer this feature to a particular wireless provider by provisioning the feature for specific trunk group(s) that connects the wireless network to the SSP tandem exchange (e.g., wireless network 125 and SSP TE 120 of FIG. 1). Examples 2 and 3 illustrate IAM message examples where an International wireless roamer attempts to make a call in the United States where the calling party number is 10 digits long and 14 digits long, respectively:

| 42 | 00001010 | 0a | OF | Calling Party Number Identifier |
|---|---|---|---|---|
| 43 | 00000111 | 07 | OV | Length = 7 octets |
| 44 | -0000100 | 04 | OV | Nature of Address Indicator = International |
|  | 0------- |  | OV | Odd/Even Indicator = Even num of address signals |
| 45 | ------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 01000100 | 44 | OV | Calling Party Number = 4472122504 |

EXAMPLE 2

| 42 | 00001010 | 0a | OF | Calling Party Number Identifier |
|---|---|---|---|---|
| 43 | 00000111 | 07 | OV | Length = 7 octets |
| 44 | -0000100 | 04 | OV | Nature of Address Indicator = International |
|  | 0------- |  | OV | Odd/Even Indicator = Even num of address signals |
| 45 | ------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 01000100 | 44 | OV | Calling Party Number = 44721225042244 |

EXAMPLE 3

In both of these examples, a conventional SS7 network would block the call preventing the International roamer from completing a call in the United States using his/her mobile terminal associated with the International calling party number. Although only 14 digits are shown in Example 3, in accordance with some embodiments of the present invention, the flex calling party module 212 may allow up to 18 digits in the calling party number field in accordance with the SS7 standard. It will be understood that the flex calling party module 212 may be configured to process varying/increasing numbers of digits in the calling party number field as the SS7 standard evolves.

Returning to FIG. 3, if the nature of address indicator is unique national and the calling party number is 10 digits, then this is a conventional case and the flex calling party module 212 in the SSP may allow the SS7 network to process the call conventionally. Example 1 above illustrates the relevant portion of the IAM message for this case.

If, however, that nature of address indicator is unique national and the calling party number is greater than 10 digits, then the flex calling party module 212 may allow the SS7 network to process the call and allow/block the calling party number from being forwarded to the destination SSP via, potentially, one or more STPs. A call record may be created to allow the call to be billed. The decision on whether to allow the calling party number to be forwarded to the destination SSP may depend on whether the features/services that are supported by the additional digits (i.e., the digits in the calling party number that exceeds the 10-digits to define the directory number for the calling party) have been paid for by the customer and/or provisioned by the service provider. Example 4 illustrates the relevant portion of the IAM message for a nature of address type of unique national and a calling party number that is 14 digits long:

| 42 | 00001010 | 0a | OF | Calling Party Number Identifier |
|---|---|---|---|---|
| 43 | 00000111 | 07 | OV | Length = 7 octets |
| 44 | -0000011 | 03 | OV | Nature of Address Indicator = Unique national number |
|  | 0------- |  | OV | Odd/Even Indicator = Even num of address signals |
| 45 | ------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 00000010 | 02 | OV | Calling Party Number = 20595225042222 |

EXAMPLE 4

As discussed above, the flex calling party module 212 may be configured to process calling party numbers that are up to 18 digits long or longer depending on how the SS7 standard evolves. Advantageously, by allowing the SS7 network to process the additional digits in the calling party number field, a service provider may offer value added services, such as, for example, a push-to-talk service over the PSTN by using digits 11 through 14 to facilitate point-to-point push-to-talk service and digits 11 through 16 to facilitate group push-to-talk service. As used herein, push-to-talk services refers to a feature that is available on certain mobile phones such that, when the phone is in a special mode, the mobile phone may function as a digital two-way radio in push-to-talk operation. Only one person at a time may be able to talk by pressing a push-to-talk button, but one or more people can listen instantly. Digits 11 through 18 may also be used to support other value added services, such as, but not limited to, paging features, alarm features, and/or various client features provided on mobile terminals. In particular embodiments of the present invention, on point-to-point calls, the 14 digits are made up of the Originating Party's Number [10 Digits] plus four additional digits to identify the client to turn on. In the case of a particular wireless service provider, the additional four digits are "3333." The digits "3333" tell the client that this is a point-to-point call. Thus, the 14 digits for a point-to-point push-to-talk call may be, for example, 77035233703333. For push-to-talk group calls, 16 digits may be used in the calling party number parameter. The first 12 digits may be a group identification number and the last 4 digits may be used to turn on the client on the far end. In the case of a particular wireless service provider, the last 4 digits may be "4444." This tells the client that this a group call and how to interface with other callers on the group call. Thus, the 16 digits for a push-to-talk group call may be, for example, 0311110010004444. It will be understood that the examples discussed above with respect to the push-to-talk feature are merely illustrative of some embodiments of the present invention. Multiple digit schemes may be used to support other applications, clients, features, etc. in accordance with other embodiments of the present invention.

In summary, some embodiments of the present invention may use the nature of address field and/or the calling party number field in an SS7 IAM message to provide service to, for example, International travelers in the United States who wish to make a domestic call from an International mobile terminal and/or to provide additional services to United States customers by using extra digits in the calling party number field to support, for example, such services as push-to-talk, paging, alarm, and/or other services supported by various clients on a mobile terminal.

The table of FIG. 3 illustrates the architecture, functionality, and operations of some embodiments of methods, systems, and computer program products for processing a nature of address indicator and/or calling party number to support various features for both a network service provider and/or an end user. In this regard, each block in the table represents a module, segment, or portion of code, which comprises one or more executable instructions for implementing the specified logical function(s). It should also be noted that in other implementations, the function(s) noted in the blocks may occur out of the order described with respect to FIG. 3.

Further embodiments of methods, systems, and computer program products for processing a nature of address indicator and/or calling party number to support various features for both a network service provider and/or an end user are described hereafter.

The Flex Calling Party feature is a feature that may allow a Long Distance provider to provide flexibility in the Calling Party Number Parameter within an ISUP SS7 message to meet the needs of customers using the SS7 Network. The Flex Calling Party feature, in some embodiments, may provide for processing a nature of address indicator and/or calling party number to support various features for both a network service provider and/or an end user. For example, the Flex Calling Party Feature may allow the Long Distance provider to tailor specific Nature of Address type and digit needs in the Calling Party Number Parameter in the Initial Address Message for each customer on a per trunk group basis. See Appendix A for an example of a conventional Initial Address message.

This feature may have two immediate impacts for a Long Distance provider: First, by adding flexibility in the Nature of Address parameter, this would allow the Long Distance provider to support wireless roamers from other countries who are in the United States on business or pleasure who need to make domestic calls. By allowing the Nature of Address of International in the Long Distance provider's switch, this allows the Long Distance provider to give customers better service to their customers. Second, by adding flexibility in the number of digits that can be handled, this would allow a Long Distance provider to support customers who need to transport more than the traditional 10 digits in the Calling Party Number Parameter with a Nature of Address of "Unique National."

The Flex Calling Party Feature may be added to the existing Trunk Group in a tandem switch to allow the Long Distance provider the ability to provide customized Nature of Address screening as well as customized digit transport across the Signaling System 7 Network to meet specific customer needs. It will be understood that this feature functionality may be applicable to any switching system.

The screening of Nature of Address allows the Long Distance provider to support International wireless roamers who need to make domestic calls while in the United States. The additional digit transport could be used to activate features or provide additional information digits to smart wire-line or wireless devices.

The Calling Party Number Feature may address the four following types of Calling Party Numbers digit type and counts:

1. Nature of Address: International
    Digits: 10
    Option: Allow into switch and Block this information
        On the out going IAM.
            Create a Call Detail Record
            See APPENDIX B
2. Nature of Address: International
    Digits: 11-18
    Option: Allow into switch and Block this information
        On the out going IAM
            Create a Call Detail Record
            See APPENDIX C
3. Nature of Address: Unique National
    Digits: 10
    Option: Do not interfere with existing trunk group options
4. Nature of Address: Unique National
    Digits: 11-18
    Option: Allow into Network and Allow or Block this
        Information on the out going IAM
        Create a Call Detail Record
        See APPENDIX D Existing provisioning personnel may provision the Flex Calling Party Feature at any time once the request has been made. The Flex Calling Party Feature may also be changed as the customers' needs change and there may also be a disaster recovery plan built into this feature as well for customers, which may involve continuous operation.

Exemplary Application Specifications:

A. Flex Calling Party Feature may support EANT (Feature Group D type trunk) to EANT Call Model
B. Flex Calling Party Feature may support EANT to IMT (Inter-Machine trunk) Call Model
C. Flex Calling Party Feature may be available on an individual Trunk Group basis
D. Flex Calling Party Feature may support each of the four types listed above via Keywords and options within the trunk group
E. The Call Detail Record may be able to support 15 Digits or could be modified to support all 18 digits
F. Hardware Platforms: Switching systems, such as, for example, the Nortel DMS-250

Many variations and modifications can be made to the preferred embodiments without substantially departing from the principles of the present invention. All such variations and modifications are intended to be included herein within the scope of the present invention, as set forth in the following claims.

APPENDIX A

Normal IAM SS7 Message

| Octet | Binary | Hex | Type | Description |
|---|---|---|---|---|
| 1 | -1111011 | 7b | MF | BSN = 123 |
|   | 0------ |    | MF | BIB = 0 |
| 2 | -1011001 | d9 | MF | FSN = 89 |
|   | 1------ |    | MF | FIB = 1 |
| 3 | 00------ | 3f | MF | Spare = 0 |
|   | --111111 |    | MF | LI = MSU |
| 4 | ----0101 | 95 | MF | SI = ISUP |
|   | --01---- |    | MF | Message Priority indicator = Priority 1 |
|   | 10------ |    | MF | NI = National Network |
| 5 | 00000001 | 01 | MF | DPC = 1-1-1 |
| 6 | 00000001 | 01 | MF |  |
| 7 | 00000001 | 01 | MF |  |
| 8 | 00000001 | 01 | MF | OPC = 1-1-2 |
| 9 | 00000001 | 01 | MF |  |
| 10 | 00000010 | 02 | MF |  |
| 11 | 00001100 | 0c | MF | SLS = 12 |
| 12 | 11010101 | d5 | MF | CIC = 213 |
| 13 | --000000 | 00 | MF |  |
|   | 00------ |    | MF | Spare = 0 |
| 14 | 00000001 | 01 | MF | MT = Initial Address |
| 15 | ------00 | 08 | MF | Nature of Connection Indicators Satellite Indicator = No satellite circuits |
|   | ----10-- |    | MF | Continuity Check Indicator = Performed on a previous cct |
|   | ---0---- |    | MF | Echo control Device Indicator = Not included |
|   | 000----- |    | MF | Spare = 0 |
| 16 | -------0 | 20 | MF | Forward Call Indicators: Incoming International Call Indicator = Not incoming international call |
|   | -----00- |    | MF | End to End Method Indicator = No end-to-end method |
|   | ----0--- |    | MF | Interworking Indicator = No interworking encountered |
|   | ---0---- |    | MF | IAM Segmentation Indicator = No indication |
|   | --1----- |    | MF | ISDN User Part Indicator = ISUP used all the way |
|   | 00------ |    | MF | ISUP Preference Indicator = ISUP preferred all the way |
| 17 | -------0 | 00 | MF | ISDN Access Indicator = Originating access non-ISDN |
|   | -----00- |    | MF | SCCP Method Indicator = No indication |
|   | 00000--- |    | MF | Spare = 0 |
| 18 | 00001010 | 0a | MF | Calling Party's Category = Ordinary calling subscriber |

APPENDIX A-continued

Normal IAM SS7 Message

| Octet | Binary | Hex | Type | Description |
|---|---|---|---|---|
| 19 | 00000011 | 03 | MF | Pointer to User Service Info = 3 octets |
| 20 | 00000110 | 06 | MF | Pointer to Called Party Number = 6 octets |
| 21 | 00001101 | 0d | MF | Pointer to Optional Part = 13 octets |
| 22 | 00000011 | 03 | MV | User Service Information Length = 3 octets |
| 23 | ---00000 | 80 | MV | Info transfer Capability = Speech |
|   | -00----- |    | MV | Coding Standard = CCITT standardized |
|   | 1------ |    | MV | Spare = 1 |
| 24 | ---10000 | 90 | MV | Information Transfer rate = 64 kbit/s |
|   | -00----- |    | MV | Transfer Mode = Circuit mode |
|   | 1------ |    | MV | Extension Indicator = No extension |
| 25 | 1------ | a2 | OV | Extension Bit = No extension |
|   | ---00010 |    | OV | User Info Layer 1 Protocol = Recommendation G.711 u-law speech |
|   | 101----- |    | OV | Spare = 5 |
| 26 | 00000111 | 07 | MV | Called Party Number Length = 7 octets |
| 27 | -0000011 | 03 | MV | Nature of Address Indicator = National (significant) number |
|   | 0------ |    | MV | Odd/Even Indicator = Even num of address signals |
| 28 | ----0000 | 10 | MV | Spare = 0 |
|   | 0------ |    | MV | Spare = 0 |
|   | -001---- |    | MV | Numbering Plan Indicator = ISDN (Telephony) |
| 29 | 00000010 | 02 | MV | Called Party Number = 2053522504 |
| 30 | 00110101 | 35 | MV |  |
| 31 | 00100101 | 25 | MV |  |
| 32 | 01010010 | 52 | MV |  |
| 33 | 01000000 | 40 | MV |  |
| 34 | 11101110 | ee | OV | Carrier Selection Information Identifier |
| 35 | 00000001 | 01 | OV | Length = 1 octet |
| 36 | 00000001 | 01 | OV | Carrier Selection Information = Presubscribed, not by calling party |
| 37 | 11000101 | c5 | OF | Carrier Identification Identifier |
| 38 | 00000011 | 03 | OV | Length = 3 octets |
| 39 | -010---- | 22 | OV | Type of Network Identification = National network id |
|   | ----0010 |    | OV | Network Identification Plan = 4-digit carrier id code |
| 40 | 00110000 | 30 | OV | 4-d Carrier ID Code = 0377h |
| 41 | 01110111 | 77 | OV |  |
| 42 | 00001010 | 0a | OF | Calling Party Number Identifier |
| 43 | 00000111 | 07 | OV | Length = 7 octets |
| 44 | -0000011 | 03 | OV | Nature of Address Indicator = Unique national number |
|   | 0------ |    | OV | Odd/Even Indicator = Even num of address signals |
| 45 | ------00 | 10 | OV | Screening Indicator = Reserved, user, not screened |
|   | ----00-- |    | OV | Presentation Restriction Indicator = Presentation allowed |
|   | -001---- |    | OV | Numbering Plan Indicator = ISDN (Telephony) |
| 46 | 00000010 | 02 | OV | Calling Party Number = 2059522504 |
| 47 | 10010101 | 95 | OV |  |
| 48 | 00100101 | 25 | OV |  |
| 49 | 01010010 | 52 | OV |  |
| 50 | 01000000 | 40 | OV |  |
| 51 | 11101010 | ea | OF | Originating Line Information Identifier |
| 52 | 00000001 | 01 | OV | Length = 1 octet |
| 53 | 00000000 | 00 | OV | Originating Line Information = 0 |
| 54 | 00111101 | 3d | OF | Undefined Tag: 3dh |
| 55 | 00000001 | 01 | OV | Length: 1 octet |
| 56 | 00001001 | 09 | OV | Unable to decode |
| 57 | 11000100 | c4 | OF | Jurisdiction Information Identifier |
| 58 | 00000011 | 03 | OV | Length = 3 octets |
| 59 | 00000010 | 02 | OV | Jurisdiction Information = 205931 |
| 60 | 10010101 | 95 | OV |  |
| 61 | 00010011 | 13 | OV |  |
| 62 | 11101011 | eb | OF | Charge Number Identifier |
| 63 | 00000111 | 07 | OV | Length = 7 octets |

APPENDIX A-continued

Normal IAM SS7 Message

| Octet | Binary | Hex | Type | Description |
|---|---|---|---|---|
| 64 | -0000011 | 03 | OV | Nature of Address Indicator = Calling party national number |
|  | 0------- |  | OV | Odd/Even Indicator = Even num of address signals |
| 65 | ----0000 | 10 | OV | Spare = 0 |
|  | 0------- |  | OV | Spare = 0 |
|  | -001---- |  | OV | Numbering Plan Indicator = ISDN (Telephony) |
| 66 | 00000010 | 02 | OV | Charge Number = 2059522504 |
| 67 | 10010101 | 95 | OV |  |
| 68 | 00100101 | 25 | OV |  |
| 69 | 01010010 | 52 | OV |  |
| 70 | 01000000 | 40 | OV |  |
| 71 | 00000000 | 00 | OF | End of Optional Parameters |

APPENDIX B

IAM INTERNATIONAL NOA

| Octet | Binary | Hex | Type | Description |
|---|---|---|---|---|
| 1 | -1111011 | 7b | MF | BSN = 123 |
|  | 0------- |  | MF | BIB = 0 |
| 2 | -1011001 | d9 | MF | FSN = 89 |
|  | 1------- |  | MF | FIB = 1 |
| 3 | 00------ | 3f | MF | Spare = 0 |
|  | --111111 |  | MF | LI = MSU |
| 4 | ----0101 | 95 | MF | SI = ISUP |
|  | --01---- |  | MF | Message Priority indicator = Priority 1 |
|  | 10------ |  | MF | NI = National Network |
| 5 | 00000001 | 01 | MF | DPC = 1-1-1 |
| 6 | 00000001 | 01 | MF |  |
| 7 | 00000001 | 01 | MF |  |
| 8 | 00000001 | 01 | MF | OPC = 1-1-2 |
| 9 | 00000001 | 01 | MF |  |
| 10 | 00000010 | 02 | MF |  |
| 11 | 00001100 | 0c | MF | SLS = 12 |
| 12 | 11010101 | d5 | MF | CIC = 213 |
| 13 | --000000 | 00 | MF |  |
|  | 00------ |  | MF | Spare = 0 |
| 14 | 00000001 | 01 | MF | MT = Initial Address |
| 15 | ------00 | 08 | MF | Nature of Connection Indicators Satellite Indicator = No satellite circuits |
|  | ----10-- |  | MF | Continuity Check Indicator = Performed on a previous cct |
|  | ---0---- |  | MF | Echo control Device Indicator = Not included |
|  | 000----- |  | MF | Spare = 0 |
| 16 | -------0 | 20 | MF | Forward Call Indicators: Incoming International Call Indicator = Not incoming international call |
|  | -----00- |  | MF | End to End Method Indicator = No end-to-end method |
|  | ----0--- |  | MF | Interworking Indicator = No interworking encountered |
|  | ---0---- |  | MF | IAM Segmentation Indicator = No indication |
|  | --1----- |  | MF | ISDN User Part Indicator = ISUP used all the way |
|  | 00------ |  | MF | ISUP Preference Indicator = ISUP preferred all the way |
| 17 | -------0 | 00 | MF | ISDN Access Indicator = Originating access non-ISDN |
|  | -----00- |  | MF | SCCP Method Indicator = No indication |
|  | 00000--- |  | MF | Spare = 0 |
| 18 | 00001010 | 0a | MF | Calling Party's Category = Ordinary calling subscriber |
| 19 | 00000011 | 03 | MF | Pointer to User Service Info = 3 octets |
| 20 | 00000110 | 06 | MF | Pointer to Called Party Number = 6 octets |
| 21 | 00001101 | 0d | MF | Pointer to Optional Part = 13 octets |

APPENDIX B-continued

IAM INTERNATIONAL NOA

| Octet | Binary | Hex | Type | Description |
|---|---|---|---|---|
| 22 | 00000011 | 03 | MV | User Service Information Length = 3 octets |
| 23 | ---00000 | 80 | MV | Info transfer Capability = Speech |
|  | -00----- |  | MV | Coding Standard = CCITT standardized |
|  | 1------- |  | MV | Spare = 1 |
| 24 | ---10000 | 90 | MV | Information Transfer rate = 64 kbit/s |
|  | -00----- |  | MV | Transfer Mode = Circuit mode |
|  | 1------- |  | MV | Extension Indicator = No extension |
| 25 | 1------- | a2 | OV | Extension Bit = No extension |
|  | ---00010 |  | OV | User Info Layer 1 Protocol = Recommendation G.711 u-law speech |
|  | 101----- |  | OV | Spare = 5 |
| 26 | 00000111 | 07 | MV | Called Party Number Length = 7 octets |
| 27 | -0000011 | 03 | MV | Nature of Address Indicator = National (significant) number |
|  | 0------- |  | MV | Odd/Even Indicator = Even num of address signals |
| 28 | ----0000 | 10 | MV | Spare = 0 |
|  | 0------- |  | MV | Spare = 0 |
|  | -001---- |  | MV | Numbering Plan Indicator = ISDN (Telephony) |
| 29 | 00000010 | 02 | MV | Called Party Number = 2053522504 |
| 30 | 00110101 | 35 | MV |  |
| 31 | 00100101 | 25 | MV |  |
| 32 | 01010010 | 52 | MV |  |
| 33 | 01000000 | 40 | MV |  |
| 34 | 11101110 | ee | OV | Carrier Selection Information Identifier |
| 35 | 00000001 | 01 | OV | Length = 1 octet |
| 36 | 00000001 | 01 | OV | Carrier Selection Information = Presubscribed, not by calling party |
| 37 | 11000101 | c5 | OF | Carrier Identification Identifier |
| 38 | 00000011 | 03 | OV | Length = 3 octets |
| 39 | -010---- | 22 | OV | Type of Network Identification = National network id |
|  | ----0010 |  | OV | Network Identification Plan = 4-digit carrier id code |
| 40 | 00110000 | 30 | OV | 4-d Carrier ID Code = 0377h |
| 41 | 01110111 | 77 | OV |  |
| 42 | 00001010 | 0a | OF | Calling Party Number Identifier |
| 43 | 00000111 | 07 | OV | Length = 7 octets |
| 44 | -0000100 | 04 | OV | Nature of Address Indicator = International |
|  | 0------- |  | OV | Odd/Even Indicator = Even num of address signals |
| 45 | -------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 01000100 | 44 | OV | Calling Party Number = 4472122504 |
| 47 | 10010101 | 27 | OV |  |
| 48 | 00100101 | 21 | OV |  |
| 49 | 01010010 | 52 | OV |  |
| 50 | 01000000 | 40 | OV |  |
| 51 | 11101010 | ea | OF | Originating Line Information Identifier |
| 52 | 00000001 | 01 | OV | Length = 1 octet |
| 53 | 00000000 | 00 | OV | Originating Line Information = 0 |
| 54 | 00111101 | 3d | OF | Undefined Tag: 3dh |
| 55 | 00000001 | 01 | OV | Length: 1 octet |
| 56 | 00001001 | 09 | OV | Unable to decode |
| 57 | 11000100 | c4 | OF | Jurisdiction Information Identifier |
| 58 | 00000011 | 03 | OV | Length = 3 octets |
| 59 | 00000010 | 02 | OV | Jurisdiction Information = 205931 |
| 60 | 10010101 | 95 | OV |  |
| 61 | 00010011 | 13 | OV |  |
| 62 | 11101011 | eb | OF | Charge Number Identifier |
| 63 | 00000111 | 07 | OV | Length = 7 octets |
| 64 | -0000011 | 03 | OV | Nature of Address Indicator = Calling party national number |
|  | 0------- |  | OV | Odd/Even Indicator = Even num of address signals |

APPENDIX B-continued

IAM INTERNATIONAL NOA

| Octet | Binary | Hex | Type | Description |
|---|---|---|---|---|
| 65 | ----0000 | 10 | OV | Spare = 0 |
|  | 0------- |  | OV | Spare = 0 |
|  | -001---- |  | OV | Numbering Plan Indicator = ISDN (Telephony) |
| 66 | 00000010 | 02 | OV | Charge Number = 2059522504 |
| 67 | 10010101 | 95 | OV |  |
| 68 | 00100101 | 25 | OV |  |
| 69 | 01010010 | 52 | OV |  |
| 70 | 01000000 | 40 | OV |  |
| 71 | 00000000 | 00 | OF | End of Optional Parameters |

APPENDIX C

IAM INTERNATIONAL NOA W/ 14 DIGITS

| Octet | Binary | Hex | Type | Description |
|---|---|---|---|---|
| 1 | -1111011 | 7b | MF | BSN = 123 |
|  | 0------- |  | MF | BIB = 0 |
| 2 | -1011001 | d9 | MF | FSN = 89 |
|  | 1------- |  | MF | FIB = 1 |
| 3 | 00------ | 3f | MF | Spare = 0 |
|  | --111111 |  | MF | LI = MSU |
| 4 | ----0101 | 95 | MF | SI = ISUP |
|  | --01---- |  | MF | Message Priority indicator = Priority 1 |
|  | 10------ |  | MF | NI = National Network |
| 5 | 00000001 | 01 | MF | DPC = 1-1-1 |
| 6 | 00000001 | 01 | MF |  |
| 7 | 00000001 | 01 | MF |  |
| 8 | 00000001 | 01 | MF | OPC = 1-1-2 |
| 9 | 00000001 | 01 | MF |  |
| 10 | 00000010 | 02 | MF |  |
| 11 | 00001100 | 0c | MF | SLS = 12 |
| 12 | 11010101 | d5 | MF | CIC = 213 |
| 13 | --000000 | 00 | MF |  |
|  | 00------ |  | MF | Spare = 0 |
| 14 | 00000001 | 01 | MF | MT = Initial Address |
| 15 | ------00 | 08 | MF | Nature of Connection Indicators Satellite Indicator = No satellite circuits |
|  | ----10-- |  | MF | Continuity Check Indicator = Performed on a previous cct |
|  | ---0---- |  | MF | Echo control Device Indicator = Not included |
|  | 000----- |  | MF | Spare = 0 |
| 16 | -------0 | 20 | MF | Forward Call Indicators: Incoming International Call Indicator = Not incoming international call |
|  | -----00- |  | MF | End to End Method Indicator = No end-to-end method |
|  | ----0--- |  | MF | Interworking Indicator = No interworking encountered |
|  | ---0---- |  | MF | IAM Segmentation Indicator = No indication |
|  | --1----- |  | MF | ISDN User Part Indicator = ISUP used all the way |
|  | 00------ |  | MF | ISUP Preference Indicator = ISUP preferred all the way |
| 17 | -------0 | 00 | MF | ISDN Access Indicator = Originating access non-ISDN |
|  | -----00- |  | MF | SCCP Method Indicator = No indication |
|  | 00000--- |  | MF | Spare = 0 |
| 18 | 00001010 | 0a | MF | Calling Party's Category = Ordinary calling subscriber |
| 19 | 00000011 | 03 | MF | Pointer to User Service Info = 3 octets |
| 20 | 00000110 | 06 | MF | Pointer to Called Party Number = 6 octets |
| 21 | 00001101 | 0d | MF | Pointer to Optional Part = 13 octets |
| 22 | 00000011 | 03 | MV | User Service Information Length = 3 octets |

APPENDIX C-continued

IAM INTERNATIONAL NOA W/ 14 DIGITS

| Octet | Binary | Hex | Type | Description |
|---|---|---|---|---|
| 23 | ---00000 | 80 | MV | Info transfer Capability = Speech |
|  | -00----- |  | MV | Coding Standard = CCITT standardized |
|  | 1------- |  | MV | Spare = 1 |
| 24 | ---10000 | 90 | MV | Information Transfer rate = 64 kbit/s |
|  | -00----- |  | MV | Transfer Mode = Circuit mode |
|  | 1------- |  | MV | Extension Indicator = No extension |
| 25 | 1------- | a2 | OV | Extension Bit = No extension |
|  | ---00010 |  | OV | User Info Layer 1 Protocol = Recommendation G.711 u-law speech |
|  | 101----- |  | OV | Spare = 5 |
| 26 | 00000111 | 07 | MV | Called Party Number Length = 7 octets |
| 27 | -0000011 | 03 | MV | Nature of Address Indicator = National (significant) number |
|  | 0------- |  | MV | Odd/Even Indicator = Even num of address signals |
| 28 | ----0000 | 10 | MV | Spare = 0 |
|  | 0------- |  | MV | Spare = 0 |
|  | -001---- |  | MV | Numbering Plan Indicator = ISDN (Telephony) |
| 29 | 00000010 | 02 | MV | Called Party Number = 2053522504 |
| 30 | 00110101 | 35 | MV |  |
| 31 | 00100101 | 25 | MV |  |
| 32 | 01010010 | 52 | MV |  |
| 33 | 01000000 | 40 | MV |  |
| 34 | 11101110 | ee | OV | Carrier Selection Information Identifier |
| 35 | 00000001 | 01 | OV | Length = 1 octet |
| 36 | 00000001 | 01 | OV | Carrier Selection Information = Presubscribed, not by calling party |
| 37 | 11000101 | c5 | OF | Carrier Identification Identifier |
| 38 | 00000011 | 03 | OV | Length = 3 octets |
| 39 | -010---- | 22 | OV | Type of Network Identification = National network id |
|  | ----0010 |  | OV | Network Identification Plan = 4-digit carrier id code |
| 40 | 00110000 | 30 | OV | 4-d Carrier ID Code = 0377h |
| 41 | 01110111 | 77 | OV |  |
| 42 | 00001010 | 0a | OF | Calling Party Number Identifier |
| 43 | 00000111 | 07 | OV | Length = 7 octets |
| 44 | -0000100 | 04 | OV | Nature of Address Indicator = International |
|  | 0------- |  | OV | Odd/Even Indicator = Even num of address signals |
| 45 | ------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 01000100 | 44 | OV | Calling Party Number = 44721225042244 |
| 47 | 10010101 | 27 | OV |  |
| 48 | 00100101 | 21 | OV |  |
| 49 | 01010010 | 52 | OV |  |
| 50 | 01000000 | 40 | OV |  |
| 51 | 00100010 | 22 | OV |  |
| 52 | 01000100 | 44 | OV |  |
| 53 | 11101010 | ea | OF | Originating Line Information Identifier |
| 54 | 00000001 | 01 | OV | Length = 1 octet |
| 55 | 00000000 | 00 | OV | Originating Line Information = 0 |
| 56 | 00111101 | 3d | OF | Undefined Tag: 3dh |
| 57 | 00000001 | 01 | OV | Length: 1 octet |
| 58 | 00001001 | 09 | OV | Unable to decode |
| 59 | 11000100 | c4 | OF | Jurisdiction Information Identifier |
| 60 | 00000011 | 03 | OV | Length = 3 octets |
| 61 | 00000010 | 02 | OV | Jurisdiction Information = 205931 |
| 62 | 10010101 | 95 | OV |  |
| 63 | 00010011 | 13 | OV |  |

APPENDIX C-continued

IAM INTERNATIONAL NOA W/ 14 DIGITS

| Octet | Binary | Hex | Type | Description |
|---|---|---|---|---|
| 64 | 11101011 | eb | OF | Charge Number Identifier |
| 65 | 00000111 | 07 | OV | Length = 7 octets |
| 66 | -0000011 | 03 | OV | Nature of Address Indicator = Calling party national number |
|  | 0------- |  | OV | Odd/Even Indicator = Even num of address signals |
| 67 | ----0000 | 10 | OV | Spare = 0 |
|  | 0------- |  | OV | Spare = 0 |
|  | -001---- |  | OV | Numbering Plan Indicator = ISDN (Telephony) |
| 68 | 00000010 | 02 | OV | Charge Number = 2059522504 |
| 69 | 10010101 | 95 | OV |  |
| 70 | 00100101 | 25 | OV |  |
| 71 | 01010010 | 52 | OV |  |
| 72 | 01000000 | 40 | OV |  |
| 73 | 00000000 | 00 | OF | End of Optional Parameters |

APPENDIX D

IAM UNIQUE NATIONAL NOA W/14 DIGITS

| Octet | Binary | Hex | Type | Description |
|---|---|---|---|---|
| 1 | -1111011 | 7b | MF | BSN = 123 |
|  | 0------- |  | MF | BIB = 0 |
| 2 | -1011001 | d9 | MF | FSN = 89 |
|  | 1------- |  | MF | FIB = 1 |
| 3 | 00------ | 3f | MF | Spare = 0 |
|  | --111111 |  | MF | LI = MSU |
| 4 | ----0101 | 95 | MF | SI = ISUP |
|  | --01---- |  | MF | Message Priority indicator = Priority 1 |
|  | 10------ |  | MF | NI = National Network |
| 5 | 00000001 | 01 | MF | DPC = 1-1-1 |
| 6 | 00000001 | 01 | MF |  |
| 7 | 00000001 | 01 | MF |  |
| 8 | 00000001 | 01 | MF | OPC = 1-1-2 |
| 9 | 00000001 | 01 | MF |  |
| 10 | 00000010 | 02 | MF |  |
| 11 | 00001100 | 0c | MF | SLS = 12 |
| 12 | 11010101 | d5 | MF | CIC = 213 |
| 13 | --000000 | 00 | MF |  |
|  | 00------ |  | MF | Spare = 0 |
| 14 | 00000001 | 01 | MF | MT = Initial Address |
| 15 | ------00 | 08 | MF | Nature of Connection Indicators Satellite Indicator = No satellite circuits |
|  | ----10-- |  | MF | Continuity Check Indicator = Performed on a previous cct |
|  | ---0---- |  | MF | Echo control Device Indicator = Not included |
|  | 000----- |  | MF | Spare = 0 |
| 16 | -------0 | 20 | MF | Forward Call Indicators: Incoming International Call Indicator = Not incoming international call |
|  | -----00- |  | MF | End to End Method Indicator = No end-to-end method |
|  | ----0--- |  | MF | Interworking Indicator = No interworking encountered |
|  | ---0---- |  | MF | IAM Segmentation Indicator = No indication |
|  | --1----- |  | MF | ISDN User Part Indicator = ISUP used all the way |
|  | 00------ |  | MF | ISUP Preference Indicator = ISUP preferred all the way |
| 17 | -------0 | 00 | MF | ISDN Access Indicator = Originating access non-ISDN |
|  | -----00- |  | MF | SCCP Method Indicator = No indication |
|  | 00000--- |  | MF | Spare = 0 |
| 18 | 00001010 | 0a | MF | Calling Party's Category = Ordinary calling subscriber |
| 19 | 00000011 | 03 | MF | Pointer to User Service Info = 3 octets |
| 20 | 00000110 | 06 | MF | Pointer to Called Party Number = 6 octets |
| 21 | 00001101 | 0d | MF | Pointer to Optional Part = 13 octets |
| 22 | 00000011 | 03 | MV | User Service Information Length = 3 octets |
| 23 | ---00000 | 80 | MV | Info transfer Capability = Speech |
|  | -00----- |  | MV | Coding Standard = CCITT standardized |
|  | 1------- |  | MV | Spare = 1 |
| 24 | ---10000 | 90 | MV | Information Transfer rate = 64 kbit/s |
|  | -00----- |  | MV | Transfer Mode = Circuit mode |
|  | 1------- |  | MV | Extension Indicator = No extension |
| 25 | 1------- | a2 | OV | Extension Bit = No extension |
|  | ---00010 |  | OV | User Info Layer 1 Protocol = Recommendation G.711 u-law speech |
|  | 101----- |  | OV | Spare = 5 |
| 26 | 00000111 | 07 | MV | Called Party Number Length = 7 octets |
| 27 | -0000011 | 03 | MV | Nature of Address Indicator = National (significant) number |
|  | 0------- |  | MV | Odd/Even Indicator = Even num of address signals |
| 28 | ----0000 | 10 | MV | Spare = 0 |
|  | 0------- |  | MV | Spare = 0 |
|  | -001---- |  | MV | Numbering Plan Indicator = ISDN (Telephony) |
| 29 | 00000010 | 02 | MV | Called Party Number = 2053522504 |
| 30 | 00110101 | 35 | MV |  |
| 31 | 00100101 | 25 | MV |  |
| 32 | 01010010 | 52 | MV |  |
| 33 | 01000000 | 40 | MV |  |
| 34 | 11101110 | ee | OV | Carrier Selection Information Identifier |
| 35 | 00000001 | 01 | OV | Length = 1 octet |
| 36 | 00000001 | 01 | OV | Carrier Selection Information = Presubscribed, not by calling party |
| 37 | 11000101 | c5 | OF | Carrier Identification Identifier |
| 38 | 00000011 | 03 | OV | Length = 3 octets |
| 39 | -010---- | 22 | OV | Type of Network Identification = National network id |
|  | ----0010 |  | OV | Network Identification Plan = 4-digit carrier id code |
| 40 | 00110000 | 30 | OV | 4-d Carrier ID Code = 0377h |
| 41 | 01110111 | 77 | OV |  |
| 42 | 00001010 | 0a | OF | Calling Party Number Identifier |
| 43 | 00000111 | 07 | OV | Length = 7 octets |
| 44 | -0000011 | 03 | OV | Nature of Address Indicator = Unique national number |
|  | 0------- |  | OV | Odd/Even Indicator = Even num of address signals |
| 45 | ------00 | 10 | OV | Screening Indicator = Reserved, user, not screened |
|  | ----00-- |  | OV | Presentation Restriction Indicator = Presentation allowed |
|  | -001---- |  | OV | Numbering Plan Indicator = ISDN (Telephony) |
| 46 | 00000010 | 02 | OV | Calling Party Number = 20595225042222 |
| 47 | 10010101 | 95 | OV |  |
| 48 | 00100101 | 25 | OV |  |
| 49 | 01010010 | 52 | OV |  |
| 50 | 01000000 | 40 | OV |  |
| 51 | 00100010 | 22 | OV |  |
| 52 | 00100010 | 22 | OV |  |
| 53 | 11101010 | ea | OF | Originating Line Information Identifier |
| 54 | 00000001 | 01 | OV | Length = 1 octet |
| 55 | 00000000 | 00 | OV | Originating Line Information = 0 |
| 56 | 00111101 | 3d | OF | Undefined Tag: 3dh |
| 57 | 00000001 | 01 | OV | Length: 1 octet |
| 58 | 00001001 | 09 | OV | Unable to decode |
| 59 | 11000100 | c4 | OF | Jurisdiction Information Identifier |
| 60 | 00000011 | 03 | OV | Length = 3 octets |
| 61 | 00000010 | 02 | OV | Jurisdiction Information = 205931 |
| 62 | 10010101 | 95 | OV |  |

APPENDIX D-continued

IAM UNIQUE NATIONAL NOA W/14 DIGITS

| Octet | Binary | Hex | Type | Description |
|---|---|---|---|---|
| 63 | 00010011 | 13 | OV | |
| 64 | 11101011 | eb | OF | Charge Number Identifier |
| 65 | 00000111 | 07 | OV | Length = 7 octets |
| 66 | -0000011 | 03 | OV | Nature of Address Indicator = Calling party national number |
| | 0------- | | OV | Odd/Even Indicator = Even num of address signals |
| 67 | ----0000 | 10 | OV | Spare = 0 |
| | 0------- | | OV | Spare = 0 |
| | -001---- | | OV | Numbering Plan Indicator = ISDN (Telephony) |
| 68 | 00000010 | 02 | OV | Charge Number = 2059522504 |
| 69 | 10010101 | 95 | OV | |
| 70 | 00100101 | 25 | OV | |
| 71 | 01010010 | 52 | OV | |
| 72 | 01000000 | 40 | OV | |
| 73 | 00000000 | 00 | OF | End of Optional Parameters |

That which is claimed:

1. A method of processing a call, comprising:
performing operations as follows on at least one processor:
examining a nature of address indicator in a signaling message associated with a calling party of the call wherein the call is within a jurisdiction having a national nature of address indicator associated with the jurisdiction;
allowing the call to complete in a jurisdiction associated with a national nature of address indicator when the nature of address indicator is international; and
processing a portion of the digits associated with a calling party number to facilitate operation of a service when the nature of address indicator is national;
wherein the signaling message is a signaling system seven initial address message.

2. The method of claim 1, further comprising:
blocking a calling party number in the signaling message from being communicated with the call; and
creating a call record.

3. The method of claim 1, wherein the call originates as a wireless call.

4. The method of claim 1, further comprising:
blocking the calling party number from being communicated with the call when the nature of address indicator is international; and
determining whether to block the calling party number to be communicated with the call based on whether the service has been paid for by a customer when the nature of address indicator is national.

5. The method of claim 1, wherein the service is a push-to-talk service.

6. A system for processing a call, comprising:
a processor; and
a memory coupled to the processor and comprising computer executable program code that when executed by the processor causes the processor to perform operations comprising:
examining a nature of address indicator in a signaling message associated with a calling party of the call wherein the call is within a jurisdiction having a national nature of address indicator associated with the jurisdiction;
allowing the call to complete in a jurisdiction associated with a national nature of address indicator when the nature of address indicator is international; and
processing a portion of the digits associated with a calling party number to facilitate operation of a service when the nature of address indicator is national;
wherein the signaling message is a signaling system seven initial address message.

7. The system of claim 6, wherein the operations further comprise:
blocking a calling party number in the signaling message from being communicated with the call; and
creating a call record.

8. The system of claim 6, wherein the call originates as a wireless call.

9. The system of claim 6, wherein the operations further comprise:
blocking the calling party number from being communicated with the call when the nature of address indicator is international; and
determining whether to block the calling party number to be communicated with the call based on whether the service has been paid for by a customer when the nature of address indicator is national.

10. The system of claim 6, wherein the service is a push-to-talk service.

11. A computer program product for processing a call, comprising:
a computer readable medium comprising computer readable program code that when executed by a processor causes the processor to perform operations comprising:
examining a nature of address indicator in a signaling message associated with a calling party of the call wherein the call is within a jurisdiction having a national nature of address indicator associated with the jurisdiction;
allowing the call to complete in a jurisdiction associated with a national nature of address indicator when the nature of address indicator is international; and
processing a portion of the digits associated with a calling party number to facilitate operation of a service when the nature of address indicator is national;
wherein the signaling message is a signaling system seven initial address message.

12. The computer program product of claim 11, wherein the operations further comprise:
blocking a calling party number in the signaling message from being communicated with the call; and
creating a call record.

13. The computer program product of claim 11, wherein the call originates as a wireless call.

14. The computer program product of claim 11, wherein the operations further comprise:
blocking the calling party number from being communicated with the call when the nature of address indicator is international; and
determining whether to block the calling party number to be communicated with the call based on whether the service has been paid for by a customer when the nature of address indicator is national.

15. The computer program product of claim 11, wherein the service is a push-to-talk service.

* * * * *